(12) United States Patent
Ido (10) Patent No.: US 8,081,218 B2
(45) Date of Patent: Dec. 20, 2011

(54) COMMUNICATION APPARATUS AND METHOD FOR PROVIDING A SERVICE TO A DESIRED COMMUNICATION DEVICE

(75) Inventor: Tetsuo Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 446 days.

(21) Appl. No.: 11/723,045

(22) Filed: Mar. 16, 2007

(65) Prior Publication Data

US 2007/0223670 A1 Sep. 27, 2007

(30) Foreign Application Priority Data

Mar. 22, 2006 (JP) ................................. 2006-079059

(51) Int. Cl.
*H04N 5/225* (2006.01)
(52) U.S. Cl. ............... 348/207.2; 348/207.1; 348/211.1; 348/211.4
(58) Field of Classification Search ............... 348/207.2, 348/207.99–376, 207.1, 207.11, 211.1–211.4
See application file for complete search history.

(56) References Cited

U.S. PATENT DOCUMENTS

| 6,529,522 | B1 * | 3/2003 | Ito et al. ........................ 370/466 |
| 6,603,506 | B2 * | 8/2003 | Ogawa et al. ............. 348/207.2 |
| 6,950,125 | B1 * | 9/2005 | Sato ............................ 348/207.2 |
| 7,359,080 | B2 * | 4/2008 | Takemura .................... 358/1.15 |
| 7,461,189 | B2 * | 12/2008 | Yamaya ........................ 710/104 |
| 7,545,406 | B2 * | 6/2009 | Itsukaichi ................... 348/207.2 |
| 7,576,779 | B2 * | 8/2009 | Tanaka et al. ............. 348/211.4 |
| 2002/0013885 | A1 * | 1/2002 | Kobayashi et al. ........... 711/115 |
| 2002/0147819 | A1 | 10/2002 | Miyakoshi et al. |
| 2004/0046990 | A1 * | 3/2004 | Yano et al. .................... 358/1.15 |
| 2004/0102192 | A1 * | 5/2004 | Serceki .......................... 455/434 |
| 2004/0184078 | A1 * | 9/2004 | Endo et al. .................... 358/1.15 |
| 2004/0198430 | A1 | 10/2004 | Moriyama et al. |
| 2004/0263872 | A1 * | 12/2004 | Uchiyama ...................... 358/1.2 |
| 2006/0009260 | A1 * | 1/2006 | Takemura .................. 455/556.1 |
| 2006/0101280 | A1 * | 5/2006 | Sakai ............................. 713/184 |
| 2006/0158518 | A1 * | 7/2006 | Sakai .......................... 348/207.2 |
| 2006/0200564 | A1 * | 9/2006 | Watanabe et al. ............. 709/227 |
| 2006/0203833 | A1 | 9/2006 | Hara et al. |
| 2006/0206592 | A1 * | 9/2006 | Fujii et al. ..................... 709/220 |
| 2007/0067503 | A1 * | 3/2007 | Hiroki .............................. 710/15 |
| 2007/0189322 | A1 * | 8/2007 | Hirose .......................... 370/447 |

FOREIGN PATENT DOCUMENTS

| JP | 2002-312155 A | 10/2002 |
| JP | 2002-359623 A | 12/2002 |

* cited by examiner

*Primary Examiner* — Tuan Ho
*Assistant Examiner* — Kent Wang
(74) *Attorney, Agent, or Firm* — Fitzpatrick, Cella, Harper & Scinto

(57) ABSTRACT

A communication apparatus includes a notification unit configured to notify another communication apparatus on a network of the start of a service, a reception unit configured to receive a service join request in response to the notification, a determination unit configured to determine whether to provide the service to the communication apparatus that has transmitted the join request, a transmission unit configured to transmit a service rejection message to a communication apparatus that is determined by the determination unit as a service rejection target, and a re-notification unit configured to re-notify another communication apparatus on the network of the start of the service on the basis of the determination result of the determination unit.

5 Claims, 9 Drawing Sheets

(a) DESIRED SETTING MODE CONNECTION FORM (b) FORM THAT ALLOWS CONNECTION TO CAMERA A

FIG. 1A — (a) DESIRED SETTING MODE CONNECTION FORM

FIG. 1B — (b) FORM THAT ALLOWS CONNECTION TO CAMERA A

FIG. 1C — (c) CONNECTION ERROR STATE

COMMUNICATION APPARATUS AND METHOD FOR PROVIDING A SERVICE TO A DESIRED COMMUNICATION DEVICE

BACKGROUND OF THE INVENTION

1. Field of the Invention

The present invention relates to a communication apparatus and method.

2. Description of the Related Art

In recent years, many devices having a wireless function, represented by an 802.11 wireless LAN, are introduced commercially.

For communication using a wireless LAN, it is necessary to set, in a device, wireless communication parameters such as a network identifier (SSID), encryption scheme, encryption key, authentication scheme, and authentication key. These wireless communication parameters are normally set using the user interface of the device. However, this setting operation is cumbersome. Especially with devices such as a digital camera or a printer, it is difficult to input the character string of a network identifier or an encryption key.

There is also implemented a system recently, which causes devices to directly communicate with each other by a wireless LAN without intervening any access point, i.e., communicate in a so-called ad hoc network. Even in such an ad hoc network, a method of easily setting wireless communication parameters between devices is demanded.

In techniques recently proposed by patent references mentioned below, wireless communication devices are directly connected via, e.g., a cable, and wireless communication parameters held by one device are transferred to the connected counterpart.

U.S. Pre-Granted Publication No. 2002/0147819 (Japanese Patent Laid-Open No. 2002-359623)

U.S. Pre-Granted Publication No. 2004/0198430 (Japanese Patent Laid-Open No. 2002-312155)

There is a requirement for a technique of implementing such wireless parameter transfer by wireless communication.

However, if a third, undesirable device exists in the communication range of two devices which should transfer and set parameters by wireless communication, the wireless parameter setting may be done in the third device.

For example, assume that two sets of devices (digital camera A and printer A, and digital camera B and printer B) which are going to set wireless parameters are within communication range of each other. Each device is set in a wireless parameter setting mode by a user operation so that parameter transfer and parameter setting by wireless communication are done.

If the four devices almost simultaneously shift to the wireless parameter setting mode, digital camera A may set the parameters not in printer A but in printer B depending on timing.

SUMMARY OF THE INVENTION

It is an object of the present invention to prevent service providing to an undesirable communication apparatus as much as possible and also provide a service to a desired communication apparatus without repetitive user operation.

According to one aspect of the present invention, a communication apparatus includes a notification unit configured to notify another communication apparatus on a network of a start of a service, a reception unit configured to receive a service join request in response to the notification, a determination unit configured to determine whether to provide the service to the communication apparatus that has transmitted the join request, a transmission unit configured to transmit a service rejection message to a communication apparatus that is determined by the determination unit as a service rejection target, and a re-notification unit configured to re-notify another communication apparatus on the network of the start of the service on the basis of the determination result of the determination unit.

According to another aspect of the present invention, a communication apparatus includes a request unit configured to request another communication apparatus on a network to join a service, and an inhibition unit configured to inhibit join in the service for a predetermined time upon receiving a response for the request.

According to still another aspect of the present invention, a method for controlling a communication apparatus, includes the steps of notifying another communication apparatus on a network of a start of a service, receiving a service join request in response to the notification, determining whether to provide the service to the communication apparatus that has transmitted the join request, transmitting a service rejection message to a communication apparatus that is determined in the determining step as a service rejection target, and re-notifying another communication apparatus on the network of the start of the service.

According to still another aspect of the present invention, a method for controlling a communication apparatus, includes the steps of requesting another communication apparatus on a network to join a service, and inhibiting join in the service for a predetermined time upon receiving a response for the request.

Further features of the present invention will become apparent from the following description of exemplary embodiments with reference to the attached drawings.

DESCRIPTION OF THE EMBODIMENTS

The best mode for carrying out the present invention will be described below in detail with reference to the accompanying drawings.

Figure 1A:
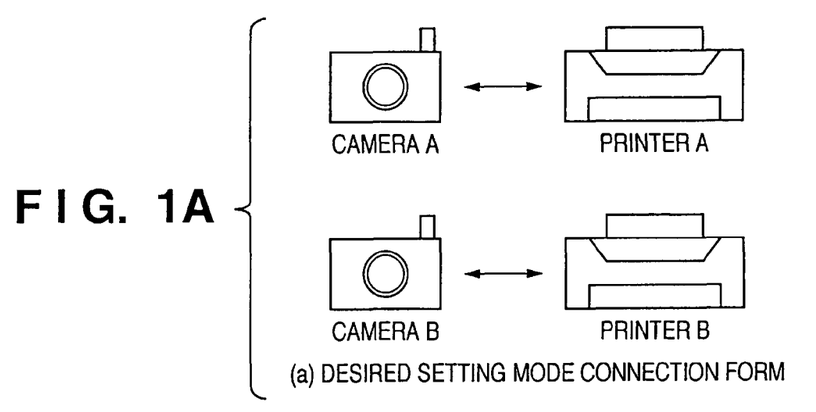
FIGS. 1A to 1C are views illustrating arrangement examples of a wireless communication system according to an embodiment of the present invention.
Figure 1B:
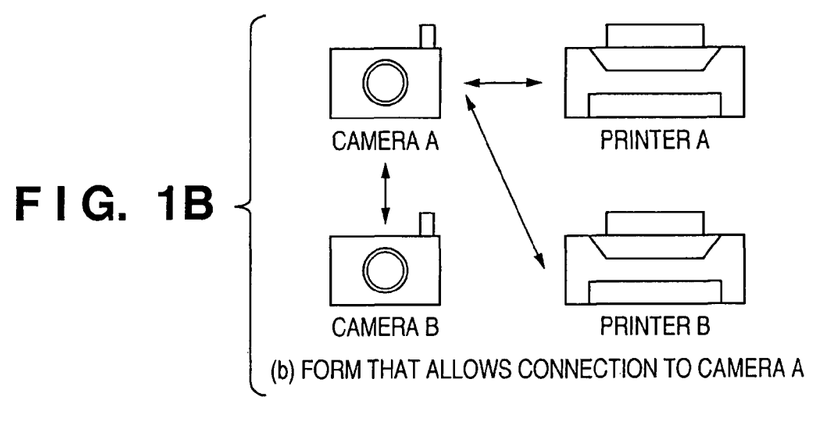
Figure 1C:
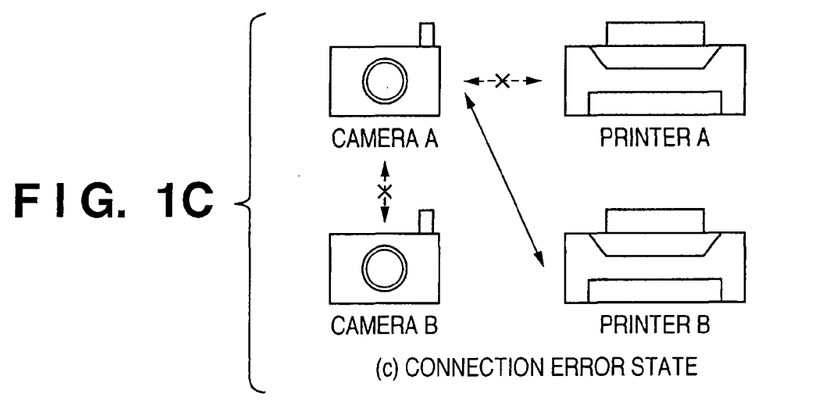

FIGS. 1A to 1C are views illustrating arrangement examples of a wireless communication system according to this embodiment. The devices have a wireless communication function and are located in a range capable of mutual wireless communication. User A has digital camera A and printer A. User B has digital camera B and printer B. To directly transmit image data from each digital camera to the corresponding printer, digital camera A is going to set wireless parameters in printer A, whereas digital camera B is going to set wireless parameters in printer B (FIG. 1A). However, digital camera A may wirelessly connect to printer B, as shown in FIG. 1C, because the devices are located in a mutually connectable range (FIG. 1B).

Figure 2:
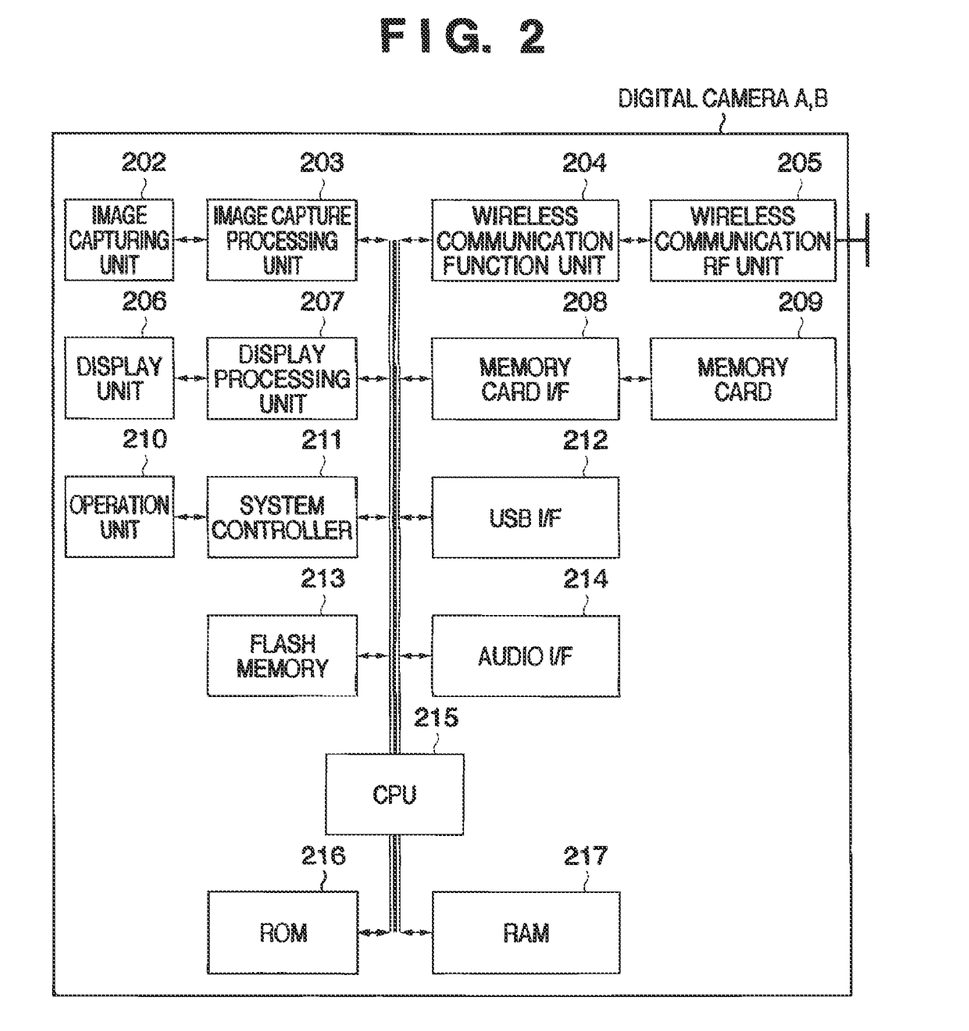
FIG. 2 is a functional block diagram of digital cameras A and B.

FIG. 2 is a functional block diagram illustrating the functional arrangement of digital cameras A and B.

An operation unit 210 connects to a CPU 215 via a system controller 211. The CPU 215 receives various kinds of signals generated by a user operation on the operation unit 210 and determines the operation contents. The operation unit 210 includes a shutter switch and various kinds of keys.

An image capturing unit 202 has a function of capturing an image in response to a press on the shutter button. An image capture processing unit 203 controls the operation of the image capturing unit 202.

A display unit 206 having a liquid crystal display function, LED indicating function, or audio output function displays/outputs a message to user A, and display processing unit 207 controls the display contents. An operation of, e.g., making the user select a desired operation from menu information displayed on the display unit 206 is executed in synchronism with the operation unit 210. That is, the display unit 206 and operation unit 210 form a user interface (UI).

A wireless communication function unit 204 wirelessly transmits/receives data. An RF unit 205 transmits/receives a radio signal to/from another wireless communication device.

A memory card interface 208 connects a memory card 209 to store captured image data. A USB interface 212 connects the digital camera to an external device via a USB cable.

An audio interface 214 connects an audio signal to an external device.

The CPU 215 controls these function units. A ROM 216 or a flash memory 213 stores programs to be executed by the CPU 215. Data to be processed by the CPU 215 is written in a RAM 217 or the flash memory 213 and read out from there. The flash memory 213 provides a nonvolatile storage area to store wireless communication setting information. Captured image data is compressed by a known compression technique and written (saved) in the memory card 209 via the memory card interface 208.

Figure 3:
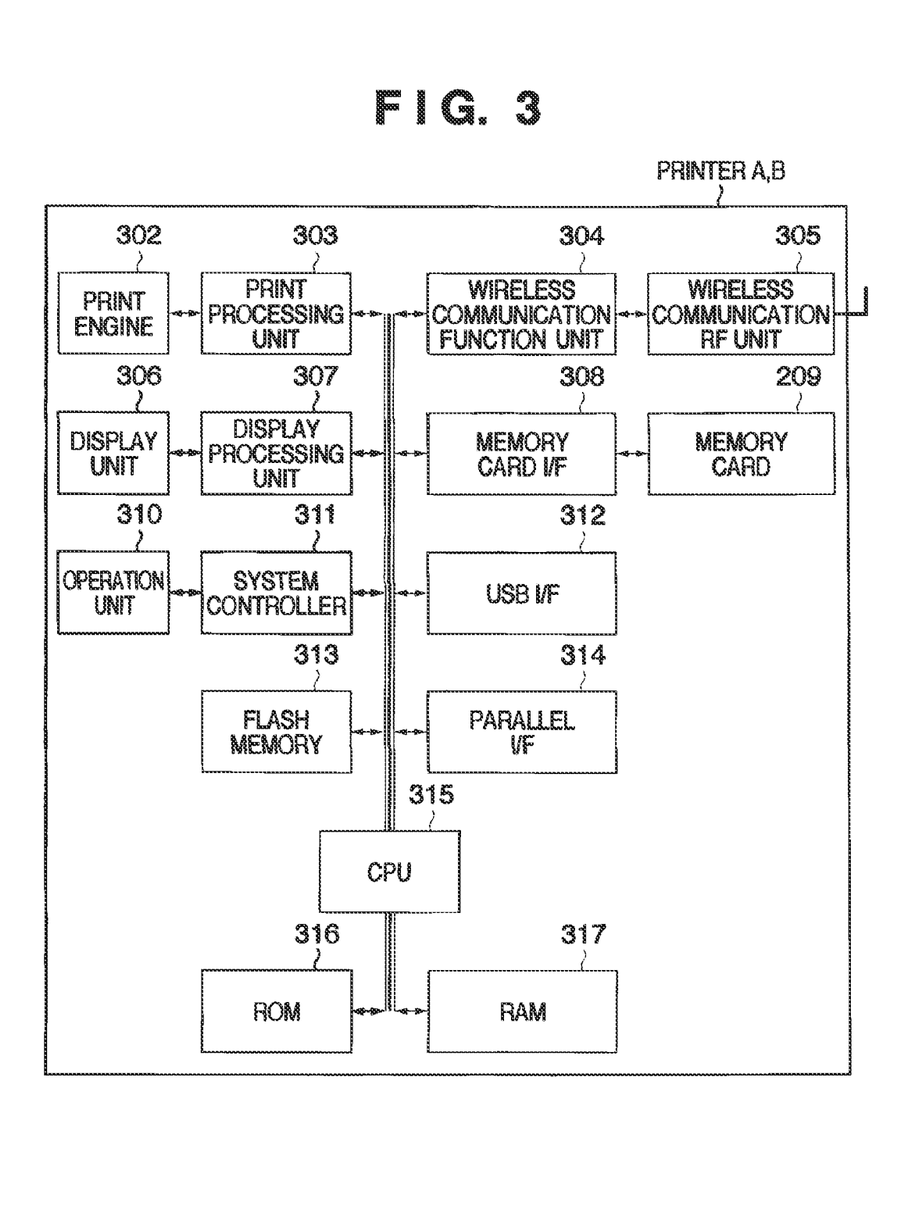
FIG. 3 is a functional block diagram of printers A and B.

FIG. 3 is a functional block diagram illustrating the functional arrangement of printers A and B.

An operation unit 310 connects to a CPU 315 via a system controller 311. The CPU 315 receives various kinds of signals generated by a user operation on the operation unit 310 and determines the operation contents.

A printer engine 302 prints an image on a print sheet on the basis of image data. A print processing unit 303 controls the operation of the printer engine 302.

A display unit 306 having a liquid crystal display function, LED indicating function, or audio output function displays/outputs various kinds of information to user A. Display processing unit 307 controls the display unit 306. An operation of, e.g., making the user select a desired item from menu information displayed on the display unit 306 is executed in cooperation with the operation unit 310. That is, the display unit 306 and operation unit 310 form a user interface (UI).

A wireless communication function unit 304 wirelessly transmits/receives data. An RF unit 305 transmits/receives a radio signal to/from another wireless communication device.

A memory card interface 308 connects a detachable memory card 309. When the memory card 209 mounted in digital camera A or B is inserted into the memory card interface 308, image data stored in the memory card 209 can be printed.

A USB interface 312 connects the printer to an external device using a USB. A parallel interface 314 connects the printer to an external device (mainly a host computer) using parallel communication.

The CPU 315 controls these function units. A ROM 316 or a flash memory 313 stores programs to be executed by the CPU 315. Data to be processed by the CPU 315 is written in a RAM 317 or the flash memory 313 and read out from there. The flash memory 313 provides a nonvolatile storage area to store wireless communication setting information.

Each device has a "setting model" to set wireless parameters. Each device has a "setting mode" start button. When the user presses the button, the "setting mode" starts.

Each device stores in advance, in the flash memory 213 or 313, parameters (e.g., parameter setting network identifier and parameter setting radio CH) of a network temporarily formed for parameter setting in the "setting mode".

Printer A or B stores parameters (e.g., network identifier and radio CH) to be used for actual data communication in the flash memory 313 in advance and transfers them to digital camera A or B in the "setting mode".

The devices use the same temporary network parameters. Printers A and B use different data communication parameters.

When the "setting mode" is set, each device temporarily forms a parameter setting network on the basis of the parameters stored in the flash memory 213 or 213 (this must be 313) in advance. Each printer transfers the data communication parameters to a corresponding digital camera in the formed temporary network, thereby setting the parameters. When parameter setting is ended, the "setting mode" finishes. On the basis of the set parameters, the printer and digital camera form a new data communication wireless network.

A process example will be described here assuming that user A presses the "setting mode" start button to do parameter setting between digital camera A and printer A, and almost simultaneously, user B presses the "setting mode" start button for digital camera B and printer B.

Figure 4A:
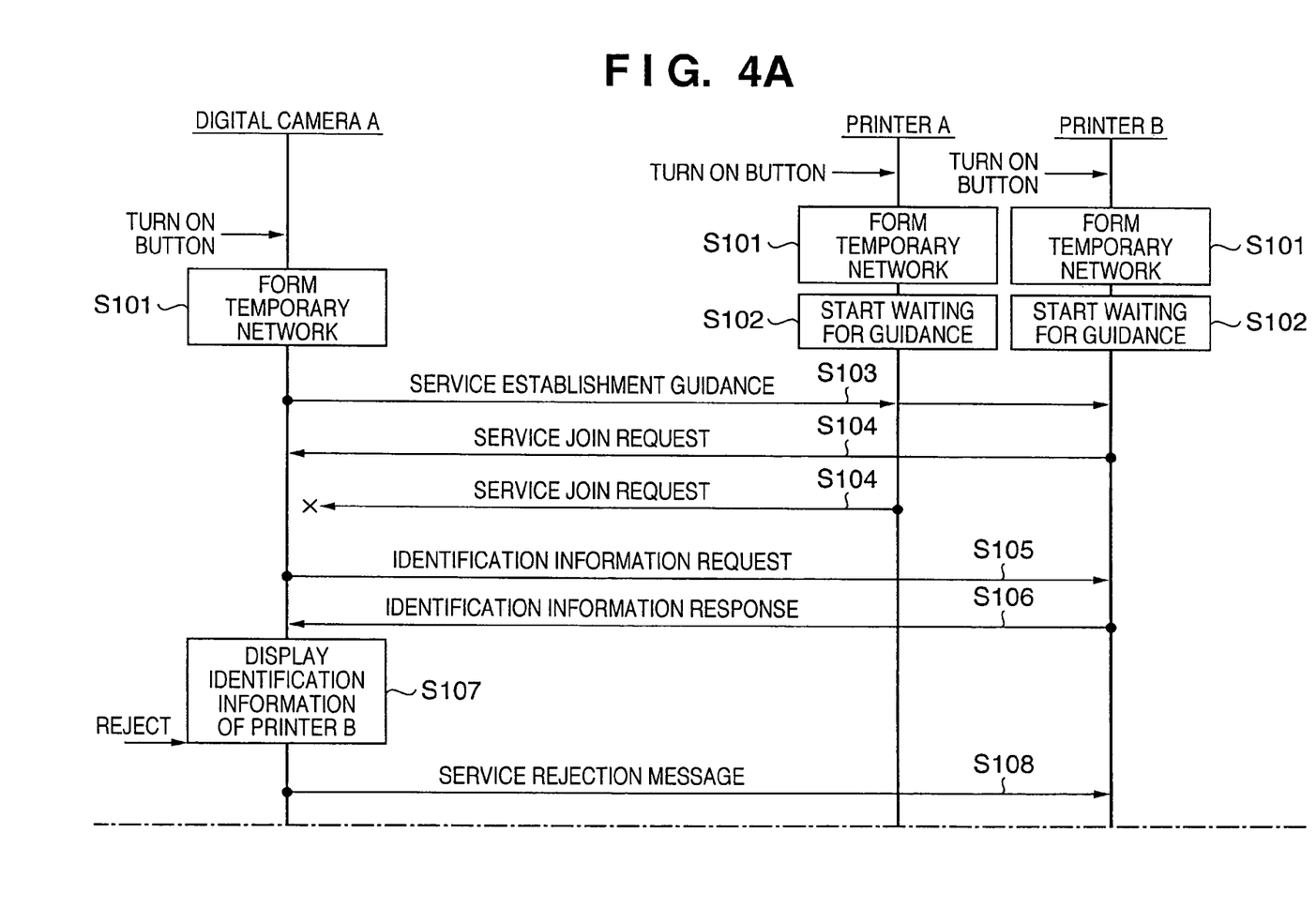
FIGS. 4A and 4B are sequence charts of digital camera A and printers A and B according to the embodiment.
Figure 4B:
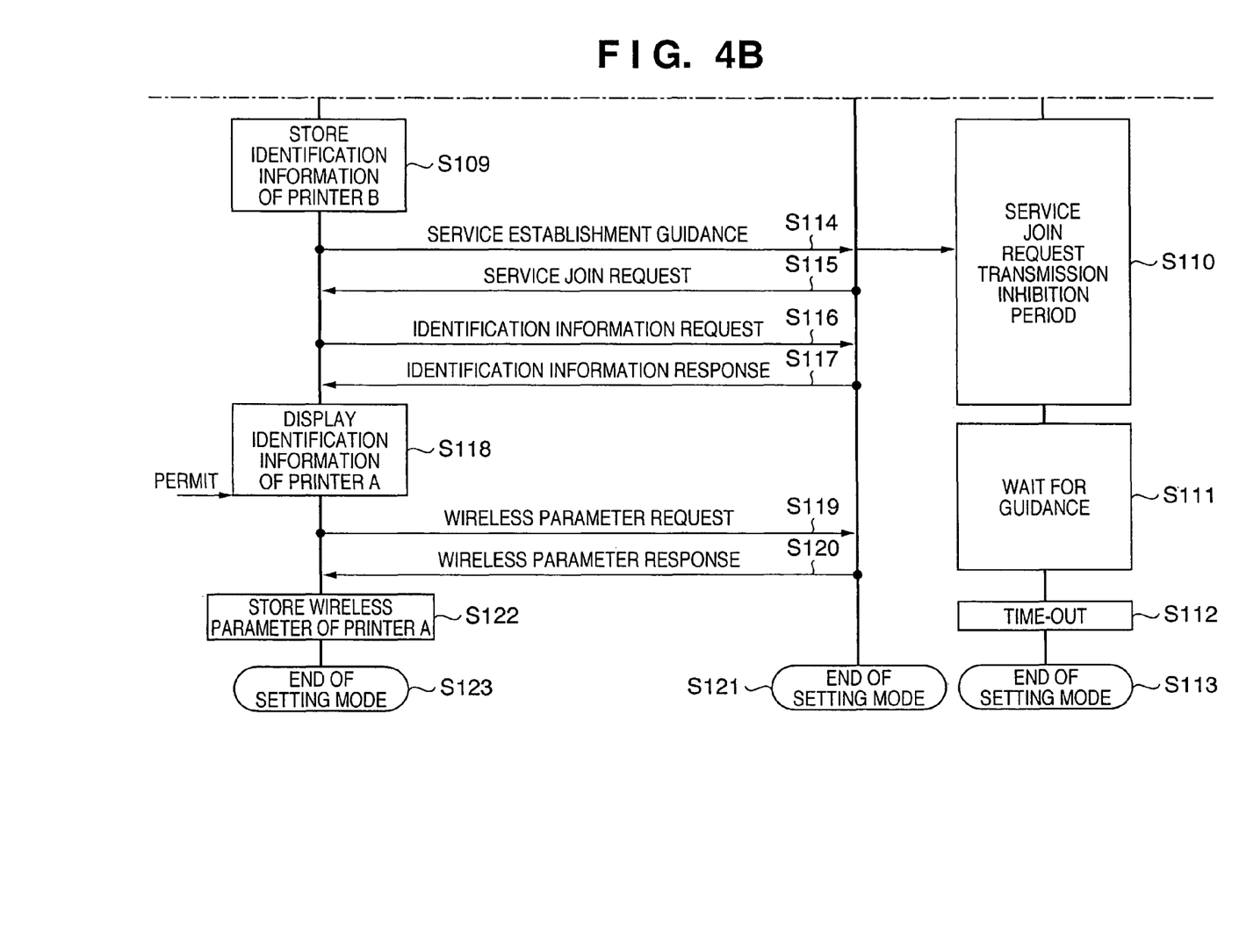

The operation sequence of digital camera A and printers A and B will be described with reference to FIGS. 4A and 4B.

When the user presses the "setting mode" start button, digital camera A and printers A and B form a temporary network for parameter setting on the basis of information stored in the flash memory 213 or 313 in advance (S101). In this case, printer A forms the temporary network. Digital camera A and printer B join the network formed by printer A.

When the temporary network is formed, printers A and B start waiting for wireless parameter setting service establishment guidance (S102). The establishment guidance indicates a notification of the start of communication parameter setting based on a predetermined protocol.

Digital camera A broadcasts the wireless parameter setting service establishment guidance (S103). Broadcast indicates data transmission to many unspecified partners.

It is determined in each device which should be executed after temporary network formation (S101), service establishment guidance waiting (S102) or service establishment guidance transmission (S103). In this embodiment, the setting is done in advance such that the printer executes service establishment guidance waiting (S102), and the digital camera executes service establishment guidance transmission (S103).

Upon receiving the service establishment guidance from digital camera A, printers A and B transmit a service join request to digital camera A (S104). Assume that printer B transmits the service join request earlier than printer A.

Control is done to make digital camera A do the process for only the device that has transmitted the service join request first. Hence, digital camera A transmits an identification information request to printer B that has transmitted the service join request first (S105).

Upon receiving the identification information request, printer B transmits its identification information to digital camera A (S106). The identification information contains first identification information such as the product name, product ID, product nickname, and nickname set by the user, and second identification information such as the device identifier and MAC address.

Figure 8:
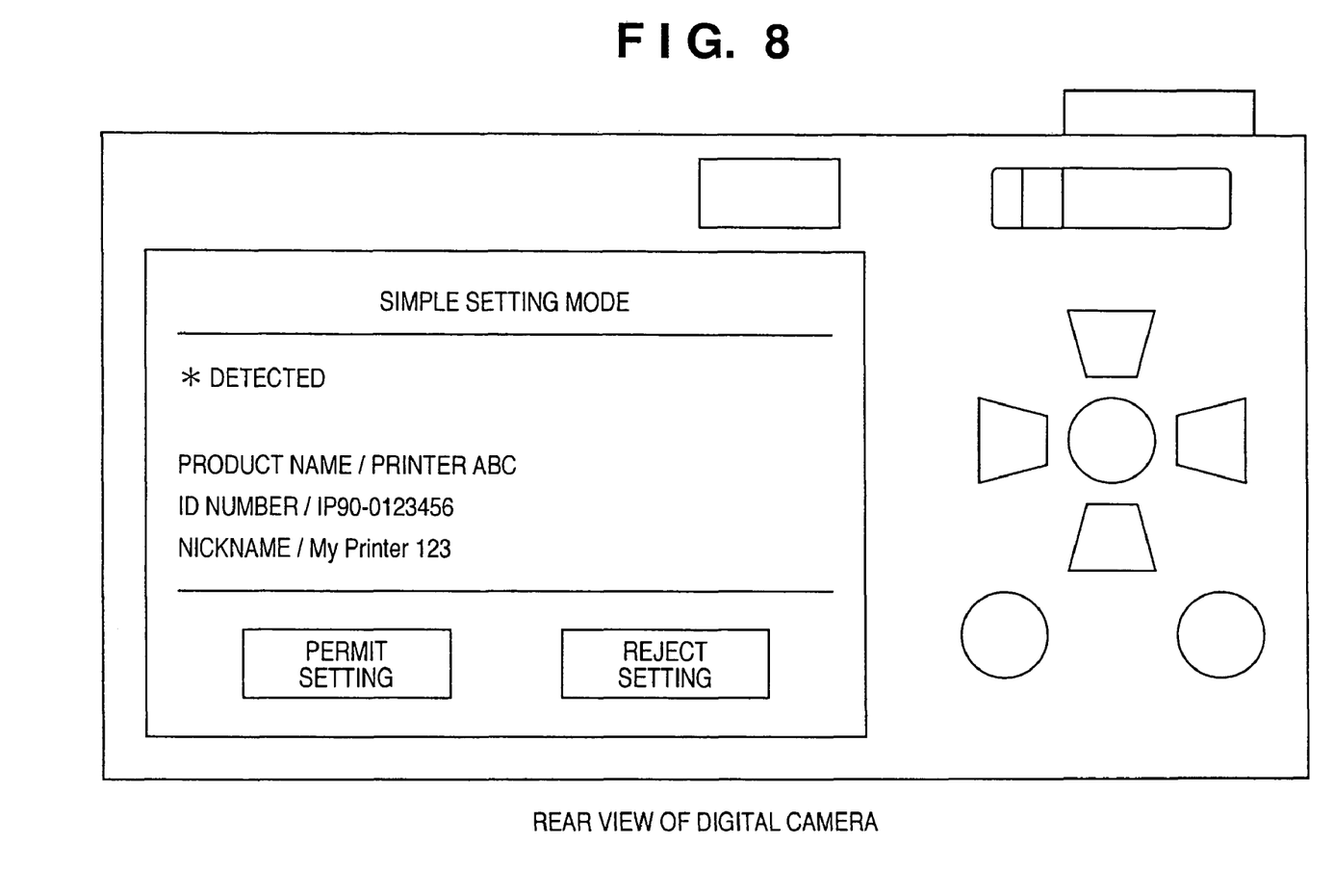
FIG. 8 is a view illustrating an example of the display contents of the display unit of the digital camera.

Digital camera A displays, on the display unit 206, the whole or partial contents of the first identification information in the received identification information response (S107). FIG. 8 shows a detailed example of the contents displayed on the display unit 206.

User A confirms the display contents and recognizes that the parameter setting request (service join request) is not of the desired device, i.e., printer A but of printer B. User A selects rejection of parameter setting in printer B via the operation unit 210 of digital camera A.

Digital camera A transmits a service rejection message to printer B (S108) and stores the second identification information of printer B in the ROM 216 as a parameter setting rejection device (S109). The order of S108 and S109 may be reversed.

Upon receiving the service rejection message, printer B is controlled to inhibit service establishment guidance waiting for a predetermined period (service join request inhibition period) (S110).

Digital camera A that has rejected parameter setting in printer B broadcasts the wireless parameter setting service establishment guidance again (S114). The service establishment guidance may be a message of service establishment re-guidance.

Upon receiving the service establishment guidance, printer A transmits a service join request to digital camera A (S115). Printer B does not transmit any join request even upon receiving the wireless parameter setting service establishment guidance because of the service join request inhibition period.

Upon receiving the service join request, digital camera A transmits an identification information request to printer A (S116). Upon receiving the identification information request, printer A transmits its identification information containing the first identification information and second identification information to digital camera A (S117).

Digital camera A displays, on the display unit 206, the whole or partial contents of the first identification information in the received identification information response (S118).

User A confirms the display contents and recognizes that the parameter setting request is of desired printer A. User A selects permission of parameter setting in printer A by operating the operation unit 210.

Digital camera A transmits a wireless parameter request to printer A (S119). Upon receiving the wireless parameter request, printer A transmits data communication wireless parameters stored in the flash memory 313 to digital camera A (S120) and ends the "setting mode" (S121).

Digital camera A stores the received data communication wireless parameters in the flash memory 213 (S122) and ends the "setting mode" (S123).

After the elapse of the service join request transmission inhibition period, printer B can start waiting for the wireless parameter setting service establishment guidance again (S111). If time-out occurs without receiving any service establishment guidance message (S112), printer B ends the "setting mode" (S113).

When the "setting mode" finishes, digital camera A and printer A can wirelessly communicate with each other by using the data communication wireless parameters stored in the flash memories 213 and 313.

Figure 6:
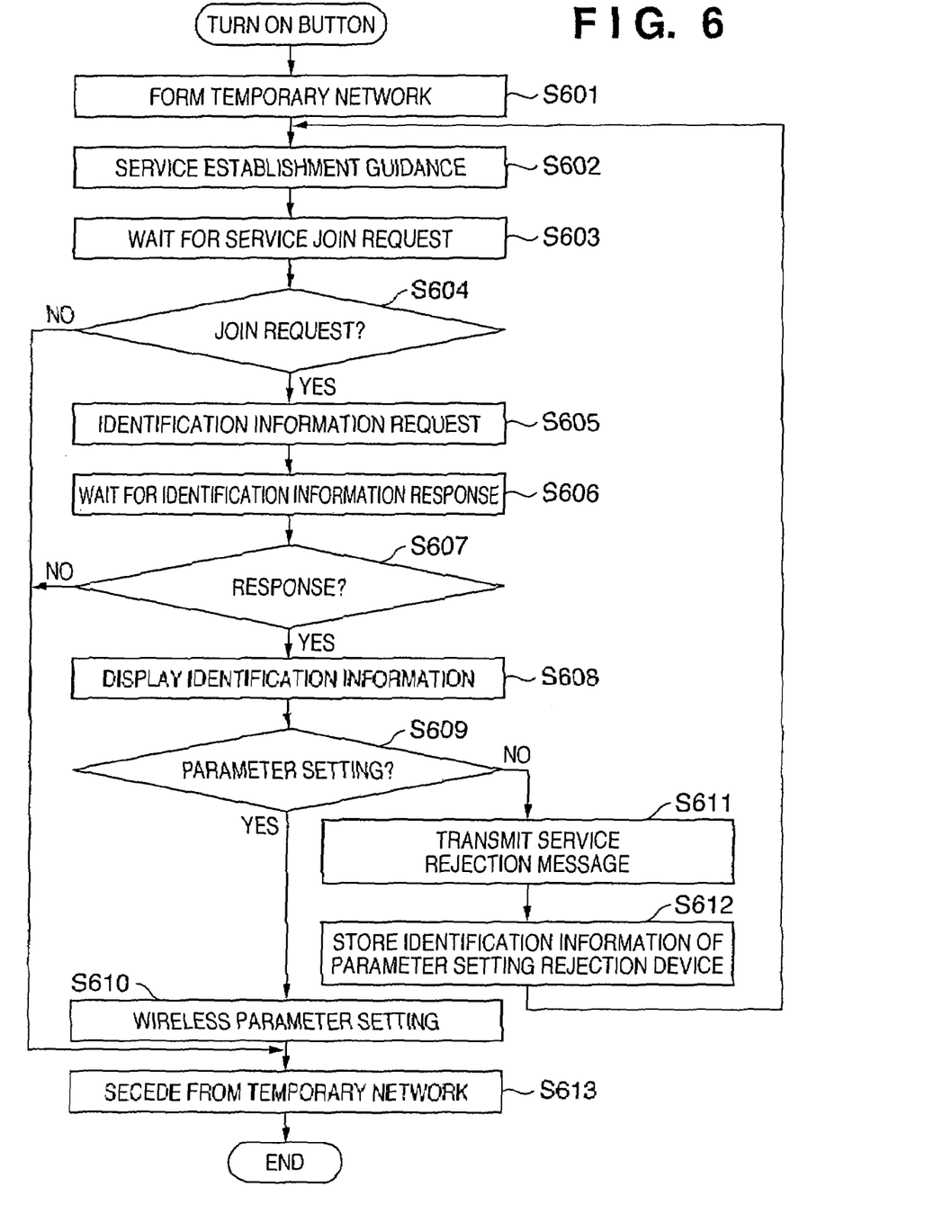
FIG. 6 is a flowchart of the operation of the digital camera.

The operation of digital camera A will be described next with reference to FIG. 6.

When user A presses the "setting mode" start button of digital camera A, a temporary network is formed by reading out wireless parameters for parameter setting from the flash memory 213 (S601). In forming the temporary network, a network formed on the basis of the same parameters is searched for. If a network is detected, digital camera A joins it. If no network is detected, digital camera A forms a temporary network by itself.

Digital camera A broadcasts the wireless parameter setting service establishment guidance to the temporary network (S602). Digital camera A waits for a service join request for a predetermined time (S603).

Upon receiving a service join request within the predetermined time (YES in step S604), digital camera A requests identification information transmission of the device that has transmitted the service join request (S605). If no service join request is received within the predetermined time (NO in step S604), the process advances to step S613.

After transmitting the identification information request, digital camera A waits for identification information as a response for a predetermined time (S606).

The identification information contains first identification information such as the product name, product ID, product nickname, and nickname set by the user, and second identification information such as the device identifier and MAC address.

Upon receiving an identification information response within the predetermined time (YES in step S607), digital camera A displays, on the display unit 206, the first identification information contained in the received identification information response (S608). If no identification information response is received within the predetermined time (NO in step S607), the process advances to step S613.

In step S609, the user confirms the contents displayed on the display unit 206 and selects, via the operation unit 210, whether to execute or reject parameter setting in the displayed partner device.

If the user selects permission of parameter setting (YES in step S609), wireless parameter setting for data communication is done in the partner device (S610). Digital camera A secedes from the temporary network (S613) and ends the "setting mode".

If the user selects rejection of parameter setting (NO in step S609), digital camera A transmits a message to reject the parameter setting service to the partner device (S611). Digital camera A also stores, in the ROM 216, the second identification information of the partner device contained in the identification information response as a parameter setting rejection device (S612). Digital camera A broadcasts the parameter setting service establishment guidance to the temporary network again (S602) and waits for a service join device (S603).

Figure 7:
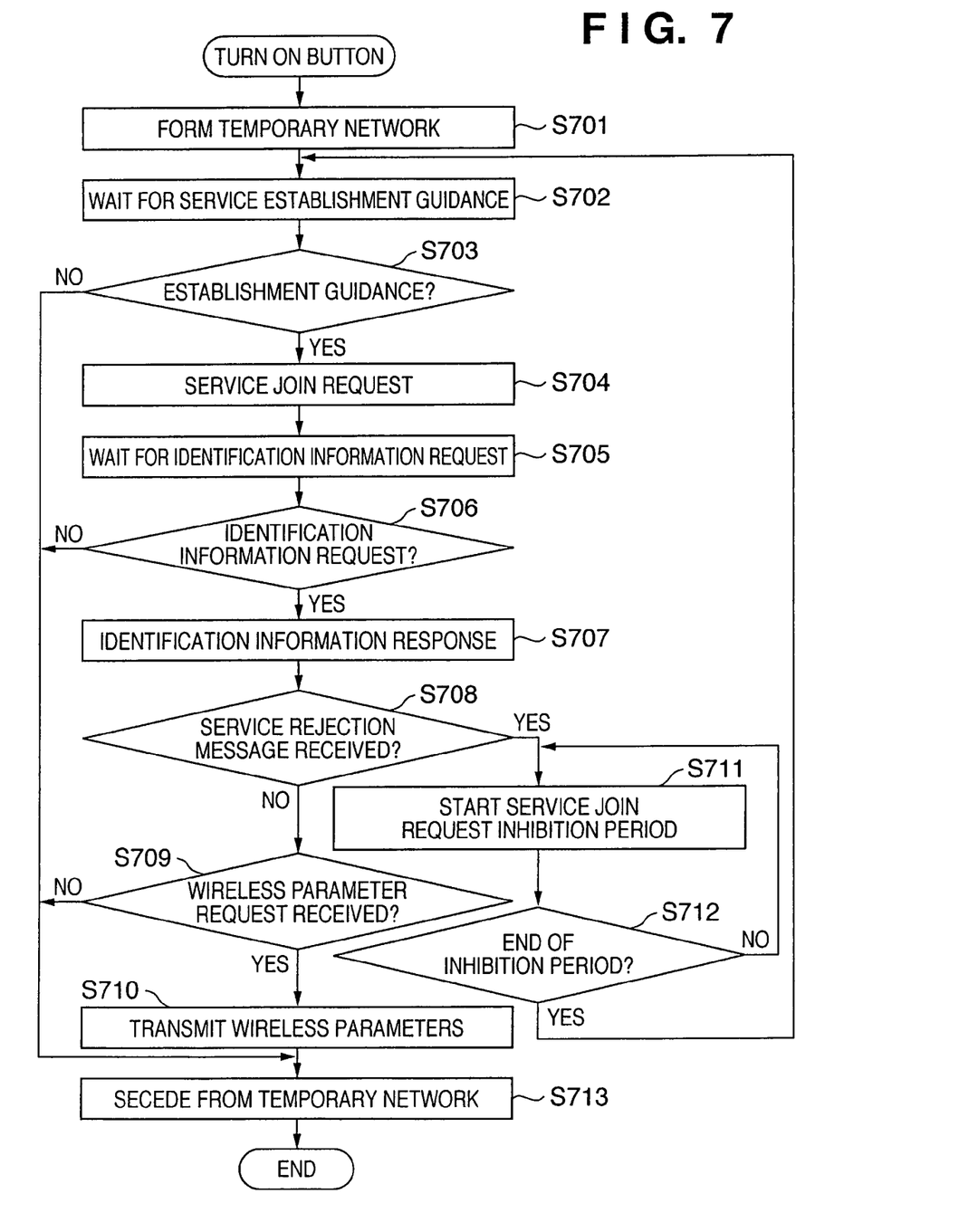
FIG. 7 is a flowchart of the operation of the printer.

The operation of printers A and B will be described next with reference to FIG. 7.

When users A and B press the "setting mode" start buttons of printers A and B, a temporary network is formed by reading out wireless parameters for parameter setting from the flash memories 313 (S701).

Printers A and B that have formed the temporary network wait for parameter setting service establishment guidance for a predetermined time (S702).

Upon receiving the service establishment guidance within the predetermined time (YES in step S703), each printer transmits a service join request to the device of the service establishment guidance transmission source (S704). If no service establishment guidance is received within the predetermined time (NO in step S703), the process advances to step S713.

After transmitting the service join request, printers A and B wait for an identification information request for a predetermined time (S705).

Upon receiving the identification information request within the predetermined time (YES in step S706), each printer returns its identification information (S707). The identification information contains first identification information such as the product name, product ID, product nickname, and nickname set by the user, and second identification information such as the device identifier and MAC address. If no identification information request is received within the predetermined time (NO in step S706), the process advances to step S713.

If printer A or B receives a service rejection message (YES in step S708), the service join request inhibition period starts (S711). When the service join request inhibition period finishes (YES in step S712), the process returns to step S702 to wait for the service establishment guidance again. If a desired device (e.g., digital camera B) joins the parameter setting network and transmits a service establishment guidance later, the printer can execute parameter setting by transmitting a join request in response to the guidance.

Upon receiving no service rejection message (NO in step S708) but a wireless parameter request (YES in step S709), the printer transmits data communication wireless parameters stored in the flash memory 313 to the partner device (S710). The printer secedes from the temporary network (S713) and ends the "setting mode". If no wireless parameter request is received (NO in step S709), the process advances to step S713.

According to this embodiment, it is possible to prevent wireless parameter setting in an undesirable device and efficiently set wireless parameters in a desired device without having to start the parameter setting process from the beginning by manual operation.

In the above description, after the elapse of the service join request inhibition period, the device waits for the service establishment guidance again. The service join request inhibition period may be the period until the end of the "setting mode". In this case, a device that has received a service rejection message never transmits a service join request until the end of the "setting mode". This enables more efficient parameter setting in a desired device.

Assume that digital camera A stores printer B as a parameter setting rejection device, and digital camera A and printer B start the wireless parameter setting process again almost simultaneously. A process in this case will be described.

Figure 5:
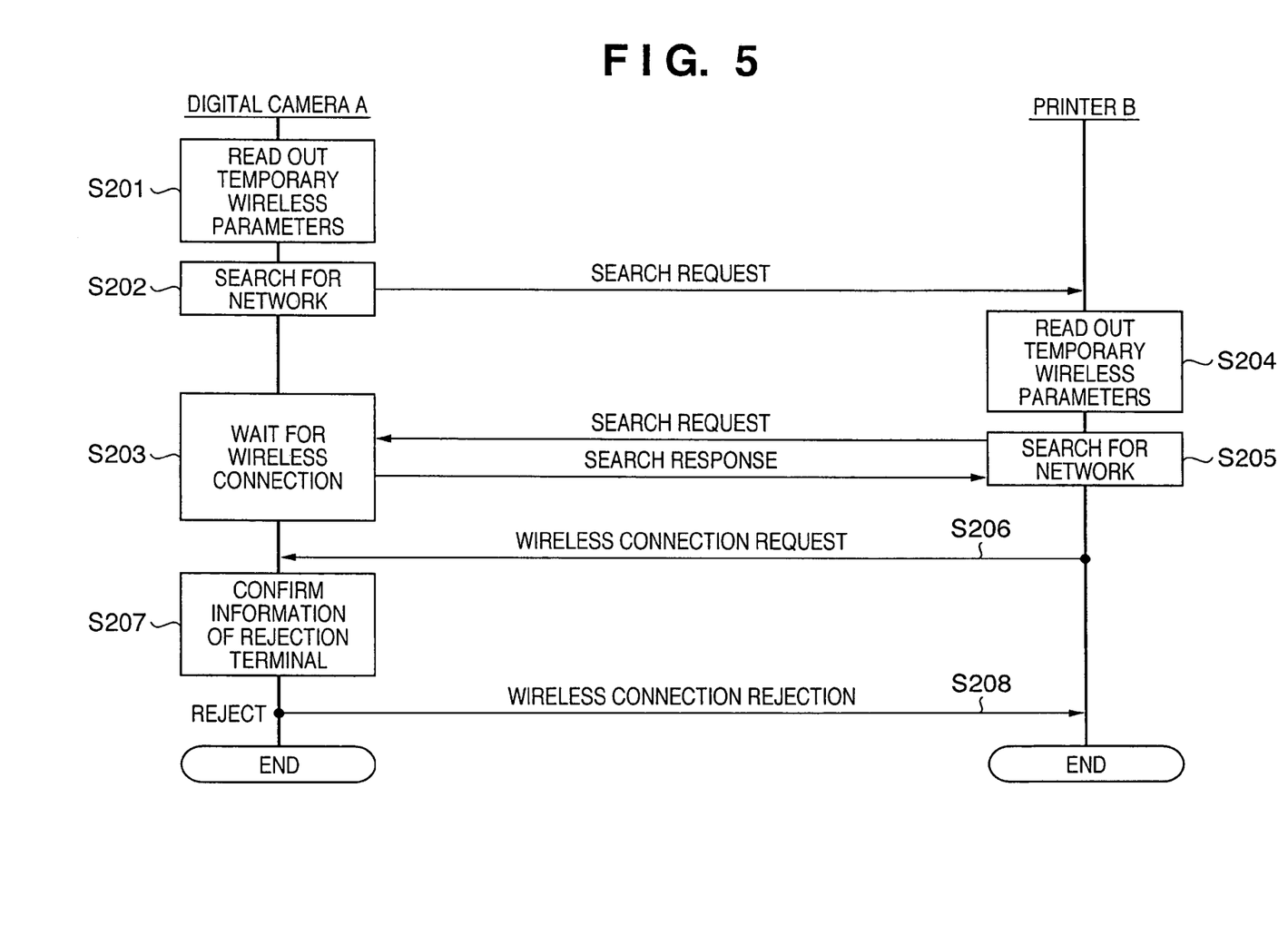
FIG. 5 is a sequence chart of digital camera A and printer B according to the embodiment.

FIG. 5 is a sequence chart illustrating a parameter setting temporary network formation process that is executed first in the "setting mode". Assume that the ROM 216 of digital camera A stores the second identification information (e.g., device identifier and MAC address) of printer B as a parameter setting rejection device.

When the "setting mode" starts, digital camera A reads out the temporary network parameters stored in the flash memory 213 (S201). Digital camera A searches for a network formed on the basis of the same parameters (S202). This search is done by transmitting a search request and determining whether a search response is received, or by determining whether a notification signal from a device that has already formed a network is received.

It is determined here that no such network is present because no response is received for the search request transmitted from digital camera A. Digital camera A forms a temporary network by itself and waits for wireless connection from another device (S203).

When the "setting mode" starts, printer B also reads out the temporary network parameters stored in the flash memory 313 (S204). Printer B also searches for a network formed on the basis of the same parameters (S205). It is determined here that a network is present because a search response from digital camera A is received for the search request. Printer B transmits a wireless connection request to digital camera A (S206).

Digital camera A confirms the identification information of the parameter setting rejection devices stored in the ROM 216 and checks whether information that matches the second identification information contained in the wireless connection request (e.g., device identifier and MAC address) exists.

Digital camera A determines printer B as a parameter setting rejection device and transmits a wireless connection rejection to printer B (S208).

As described above, from then on, no parameter setting network is formed with respect to a device that is stored as a parameter setting rejection device. Hence, any connection error to an undesirable device can be prevented.

The identification information storage period of the parameter setting rejection device can be set anyway. For example, when the storage period is set in advance, it is possible to do parameter setting even in a device defined as a parameter setting rejection device once after the elapse of the period. The user may set the storage period. The user may selectively or wholly delete the identification information of parameter setting rejection devices at a desired timing.

The present invention is applicable to any wireless communication schemes such as an 802.11 wireless LAN, BLUETOOTH, UWB, Wireless USB, Wireless 1394, and Wimax. The present invention is applicable not only to wireless communication but also to wired communication.

In the above-described embodiment, digital cameras and printers are used. However, the present invention is applicable to any other device such as a digital video camera, PC, copying machine, and portable phone.

As described above, according to the embodiments, it is possible to prevent service providing to an undesirable communication apparatus as much as possible and also provide a service to a desired communication apparatus without repetitive user operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-079059, filed Mar. 22, 2006, which is hereby incorporated by reference herein in its entirety.

What is claimed is:
1. A communication apparatus comprising:
a notification unit configured to notify one or more communication devices of a start of a service to share a network identifier of a data communication wireless network, in a parameter setting wireless network;

a reception unit configured to receive a service join request for joining the service in response to the notification, in the parameter setting wireless network;

a detecting unit configured to detect name information and identification information of a requesting device which transmitted the service join request;

a display unit configured to display the name information detected by the detecting unit so as to allow a user to select whether or not to share the network identifier between the communication apparatus and the requesting device;

a determination unit configured to determine whether to execute the service with the requesting device in response to the user's selection;

a transmission unit configured to transmit a service rejection message, for rejecting the service join request for joining the service, to the requesting device without executing the service with the requesting device, when said determination unit determines not to execute the service with the requesting device, and to transmit a service request message, for requesting the network identifier of the data communication wireless network, to the requesting device, when the determination unit determines to execute the service with the requesting device;

an obtaining unit configured to obtain the network identifier of the data communication wireless network from the requesting device, if the transmission unit transmits the service request message to the requesting device;

a storage unit configured to store identification information of the requesting device detected by the detecting unit, if the transmission unit transmits the service rejection message to the requesting device; and a rejecting unit configured to reject a request for connecting at the parameter setting wireless network from the requesting device of which the identification information is stored on the storage unit, wherein said notification unit re-notifies the one or more communication devices of the start of the service in the parameter setting wireless network, if the transmission unit transmits the service rejection message to the requesting device.

2. The apparatus according to claim 1, wherein the communication apparatus does not establish a connection via the parameter setting wireless network to the requesting device that is determined by said determination unit to not execute the service with the requesting device that transmitted the service join request.

3. The apparatus according to claim 1, wherein the identification information stored by the storage unit is erased after elapse of a predetermined period.

4. A method for controlling a communication apparatus, the method comprising the steps of:

notifying one or more communication devices of a start of a service to share a network identifier of a data communication wireless network, in a parameter setting wireless network;

receiving a service join request for joining the service in response to the notification, in the parameter setting wireless network;

detecting name information and identification information of a requesting device which transmitted the service join request;

displaying the name information detected in the detecting step so as to allow a user to select whether or not to share the network identifier between the communication apparatus and the requesting device;

determining whether to execute the service with the requesting device in response to the user's selection;

transmitting a service rejection message, for rejecting the service join request for joining the service, to the requesting device without executing the service with the requesting device, when it is determined in the determining step not to execute the service with the requesting device, and transmitting a service request message, for requesting the network identifier of the data communication wireless network, to the requesting device, when it is determined in the determining step to execute the service with the requesting device;

obtaining the network identifier of the data communication wireless network from the requesting device, if the service request message is transmitted to the requesting device in the transmitting step;

storing identification information of the requesting device detected in the detecting step, if the service rejection message is transmitted to the requesting device in the transmitting step;

rejecting a request for connecting at the parameter setting wireless network from the requesting device of which the identification information is stored; and re-notifying the one or more communication devices of the start of the service in the parameter setting wireless network, when the service rejection message is transmitted to the requesting device in the transmitting step.

5. A non-transitory computer-readable storage medium retrievably storing a computer program, wherein the program causes a computer to execute a method for controlling a communication apparatus, the method comprising the steps of:

notifying one or more communication devices of a start of a service to share a network identifier of a data communication wireless network, in a parameter setting wireless network;

receiving a service join request for joining the service in response to the notification, in the parameter setting wireless network;

detecting name information and identification information of a requesting device which transmitted the service join request;

displaying the name information detected in the detecting step so as to allow a user to select whether or not to share the network identifier between the communication apparatus and the requesting device;

determining whether to execute the service with the requesting device in response to the user's selection;

transmitting a service rejection message, for rejecting the service join request for joining the service, to the requesting device without executing the service with the requesting device, when it is determined in the determining step not to execute the service with the requesting device, and transmitting a service request message, for requesting the network identifier of the data communication wireless network, to the requesting device, when it is determined in the determining step to execute the service with the requesting device;

obtaining the network identifier of the data communication wireless network from the requesting device, if the service request message is transmitted to the requesting device in the transmitting step;

storing identification information of the requesting device detected in the detecting step, if the service rejection message is transmitted to the requesting device in the transmitting step;

rejecting a request for connecting at the parameter setting wireless network from the requesting device of which the identification information is stored; and re-notifying the one or more communication devices of the start of the service in the parameter setting wireless network, when the service rejection message is transmitted to the requesting device in the transmitting step.

* * * * *